US010117418B2

(12) United States Patent
Sterling

(10) Patent No.: US 10,117,418 B2
(45) Date of Patent: Nov. 6, 2018

(54) PET GROOMING ASSEMBLY

(71) Applicant: Mark Sterling, Salem, OR (US)

(72) Inventor: Mark Sterling, Salem, OR (US)

( * ) Notice: Subject to any disclaimer, the term of this patent is extended or adjusted under 35 U.S.C. 154(b) by 161 days.

(21) Appl. No.: 15/217,552

(22) Filed: Jul. 22, 2016

(65) Prior Publication Data

US 2018/0020640 A1 Jan. 25, 2018

(51) Int. Cl.
*A01K 13/00* (2006.01)

(52) U.S. Cl.
CPC .......... *A01K 13/004* (2013.01); *A01K 13/002* (2013.01)

(58) Field of Classification Search
CPC .......................... A01K 13/002; A01K 13/004
See application file for complete search history.

(56) References Cited

U.S. PATENT DOCUMENTS

| | | | |
|---|---|---|---|
| 4,237,822 A * | 12/1980 | Kaiser, Jr. | A01K 13/002 119/603 |
| 4,747,371 A | 5/1988 | Leopold | |
| 4,807,569 A * | 2/1989 | Leopold | A01K 13/002 119/602 |
| 4,926,796 A * | 5/1990 | Leopold | A01K 13/002 119/602 |
| D322,494 S | 12/1991 | Reynolds | |
| 5,619,953 A | 4/1997 | Griffin | |
| 7,444,949 B2 | 11/2008 | Hensley | |
| 8,667,929 B2 | 3/2014 | Sullivan et al. | |
| 2009/0165731 A1 * | 7/2009 | Garry | A01K 13/004 119/621 |
| 2014/0261223 A1 * | 9/2014 | Gee | A01K 13/004 119/621 |
| 2015/0107528 A1 * | 4/2015 | Moeller | A46B 5/0008 119/625 |
| 2017/0135314 A1 * | 5/2017 | Chura | A01K 13/004 |
| 2017/0303507 A1 * | 10/2017 | Kuo | A01K 13/004 |

FOREIGN PATENT DOCUMENTS

WO   WO2009094108   7/2009

* cited by examiner

*Primary Examiner* — Monica L Williams

(57) ABSTRACT

A pet grooming assembly includes a panel that may be coupled to a vertical support surface thereby facilitating the panel to be accessible to a pet. An adhesive layer is coupled to the panel. The adhesive layer may adhesively engage the vertical support surface. Thus, the panel is retained on the vertical support surface. A plurality of bristles is provided and each of the bristles is removably coupled to the panel. Thus, each of the bristles may frictionally engage the pet thereby facilitating the pet to groom themselves.

5 Claims, 5 Drawing Sheets

PET GROOMING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to grooming devices and more particularly pertains to a new grooming device for facilitating a cat to groom itself on a wall.

BRIEF SUMMARY OF THE INVENTION

An embodiment of the disclosure meets the needs presented above by generally comprising a panel that may be coupled to a vertical support surface thereby facilitating the panel to be accessible to a pet. An adhesive layer is coupled to the panel. The adhesive layer may adhesively engage the vertical support surface. Thus, the panel is retained on the vertical support surface. A plurality of bristles is provided and each of the bristles is removably coupled to the panel. Thus, each of the bristles may frictionally engage the pet thereby facilitating the pet to groom themselves.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
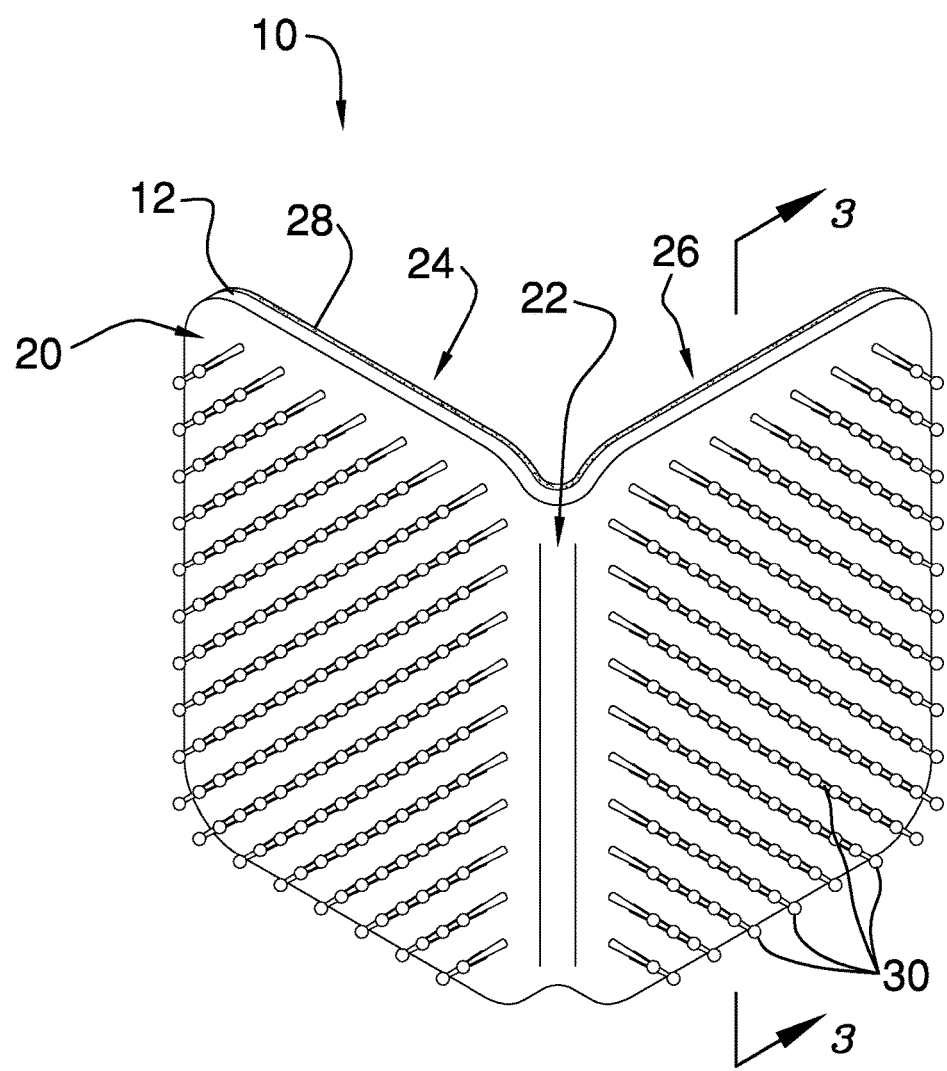
FIG. 1 is a front perspective view of a pet grooming assembly according to an embodiment of the disclosure.
Figure 2:
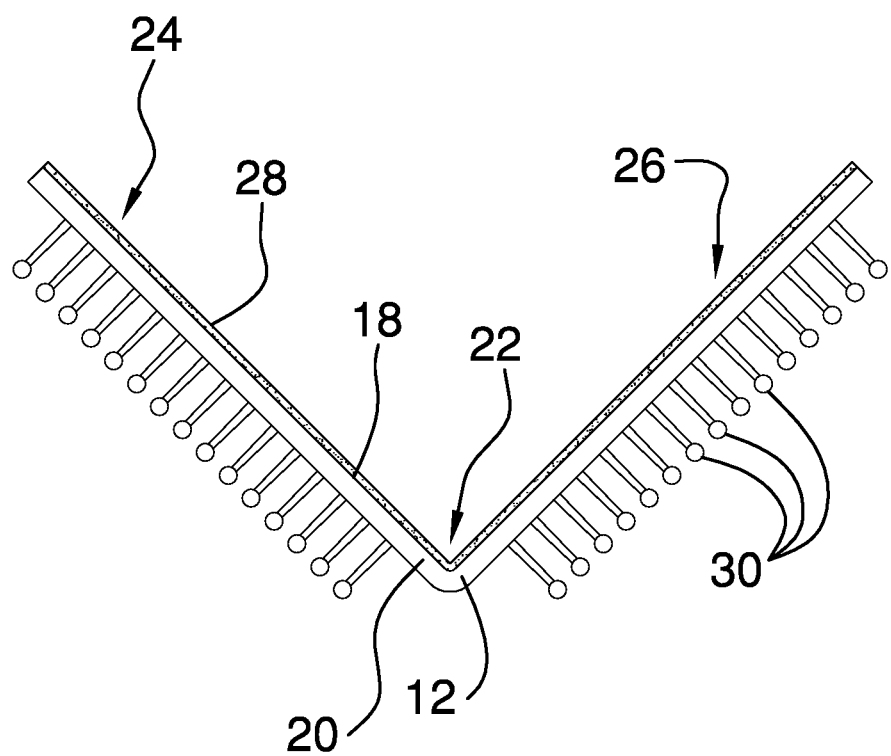
FIG. 2 is a top view of an embodiment of the disclosure.
Figure 3:
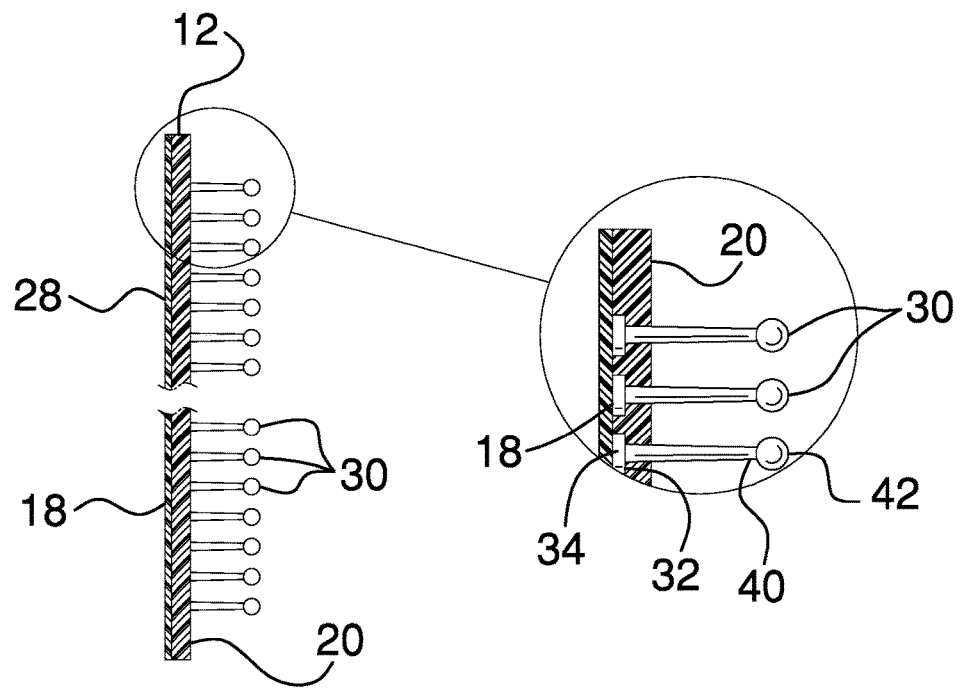
FIG. 3 is a cross sectional view taken along line 3-3 of FIG. 1 of an embodiment of the disclosure.
Figure 4:
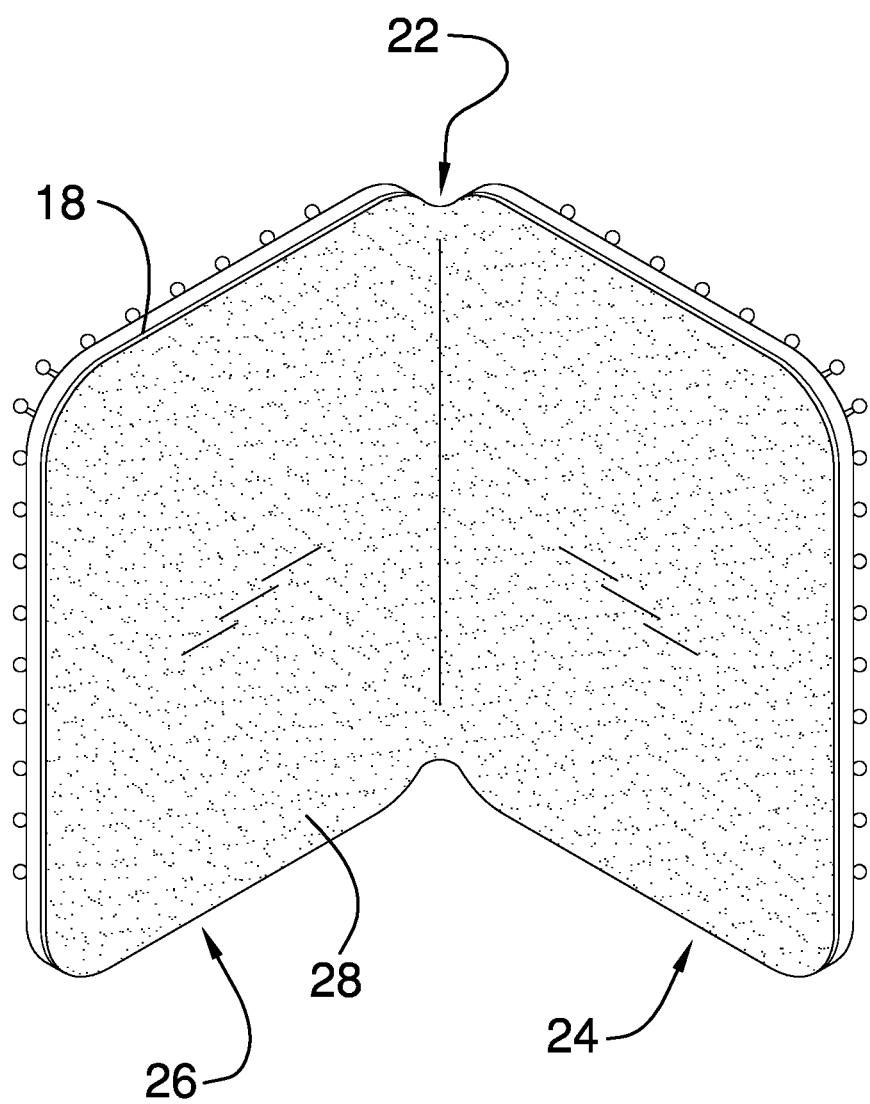
FIG. 4 is a back perspective view of an embodiment of the disclosure.
Figure 5:
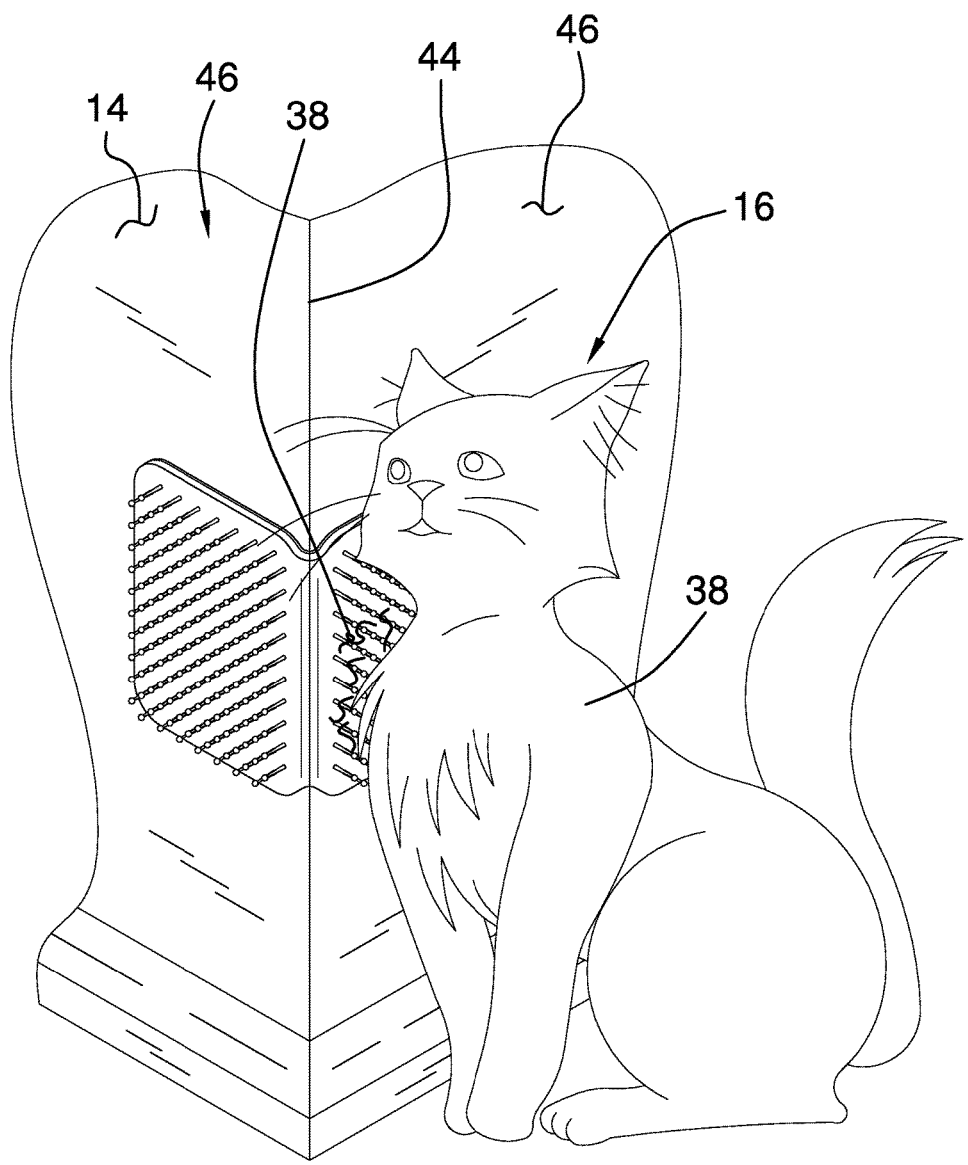
FIG. 5 is a perspective in-use view of an embodiment of the disclosure.

With reference now to the drawings, and in particular to FIGS. 1 through 5 thereof, a new grooming device embodying the principles and concepts of an embodiment of the disclosure and generally designated by the reference numeral 10 will be described.

As best illustrated in FIGS. 1 through 5, the pet grooming assembly 10 generally comprises a panel 12 that may be coupled to a vertical support surface 14. The vertical support surface 14 may be a wall in a house or the like. Thus, the panel 12 may be accessible to a pet 16. The pet 16 may be a cat.

The panel 12 has a first surface 18, a second surface 20 and a longitudinal bend 22. The longitudinal bend 22 is centrally positioned to define a first half 24 forming an angle with a second half 26. The first surface 18 corresponding to the first half 24 faces the first surface 18 corresponding to the second half 26. The panel 12 may be comprised of a resiliently compressible material such as rubber or the like.

An adhesive layer 28 is coupled to the panel 12. The adhesive layer 28 may adhesively engage the vertical support surface 14. Thus, the panel 12 is retained on the vertical support surface 14. The adhesive layer 28 is positioned on the first surface 18. The adhesive layer 28 completely covers the first surface 18 corresponding to each of the first half 24 and the second half 26.

A plurality of bristles 30 is provided and each of the bristles 30 is removably coupled to the panel 12. Thus, each of the bristles 30 may frictionally engage the pet 16 thereby facilitating the pet 16 to groom themselves. Each of the bristles 30 is positioned on the second surface 20. The bristles 30 are spaced apart from each other and are distributed on the second surface 20.

Each of the bristles 30 comprises a base 32 that is positioned within the panel 12. An outwardly facing surface 34 of the base 32 is aligned with the first surface 18. A stem 36 is coupled to and extends away from the base 32. The stem 36 extends outwardly from the second surface 20. Thus, the stem 36 may penetrate fur 38 of the pet 16 when the pet 16 rubs against the bristles 30. The stem 36 has a distal end 40 with respect to the base 32.

A ball 42 is coupled to the distal end 40 of the stem 36. The ball 42 may comb the fur 38 of the pet 16 when the pet 16 rubs against the bristles 30. Thus, loose fur 38 may be retained on the bristles 30. The stem 36 may be comprised of a flexible material thereby enhancing comfort of the bristles.

Each of the bristles 30 may be bristles from a hair brush or the like. Each of the bristles 30 may be manually inserted through the panel 12. The adhesive layer 28 may be coupled to the first surface 18 after the bristles 30 have been extended through the panel 12. The adhesive layer 28 may comprise a single use adhesive or the like.

In use, the panel 12 is positioned on a corner 44 of the vertical support surface 14. The adhesive layer 28 corresponding to each of the first half 24 and the second half 26 adhesively engage an associated one of a pair of surfaces 46 of the corner 44. Thus, each of the bristles 30 extends outwardly from the vertical support surface 14. The panel 12 is positioned at a height that is accessible to a cat. The cat rubs itself against the bristles 30 thereby facilitating the cat to groom itself.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet grooming assembly being configured to be coupled to a support surface thereby facilitating a pet to groom themselves said assembly comprising:
    a panel being configured to be coupled to a vertical support surface thereby facilitating said panel to be accessible to a pet, said panel has a first surface and a second surface, said panel having a longitudinal bend thereon, said longitudinal bend being centrally positioned to define a first half forming an angle with a second half, said first surface corresponding to said first half facing said first surface corresponding to said second half;
    an adhesive layer being coupled to said panel, said adhesive layer being configured to adhesively engage the vertical support surface thereby retaining said panel on the vertical support surface; and
    a plurality of bristles, each of said bristles being removably coupled to said panel wherein each of said bristles is configured to frictionally engage the pet thereby facilitating the pet to groom themselves, wherein each of said bristles comprises a stem being coupled to and extending away from said panel wherein said stem is configured to penetrate fur of the pet when the pet rubs against said bristles, said stem extending outwardly from said panel, said stem having a distal end with respect to said panel, wherein each of said bristles comprises a ball being coupled to said distal end wherein said ball is configured to comb the fur of the pet when the pet rubs against said bristles thereby facilitating loose fur to be retained on said bristles.

2. The assembly according to claim 1, wherein said adhesive layer is positioned on said first surface, said adhesive layer completely covering said first surface corresponding to each of said first half and said second half.

3. The assembly according to claim 1, wherein each of said bristles is positioned on said second surface, said bristles being spaced apart from each other and being distributed on said second surface.

4. The assembly according to claim 3, wherein each of said bristles comprises a base that is positioned within said panel such that an outwardly facing surface of said base is aligned with said first surface.

5. A pet grooming assembly being configured to be coupled to a support surface thereby facilitating a pet to groom themselves said assembly comprising:
    a panel being configured to be coupled to a vertical support surface thereby facilitating said panel to be accessible to a pet, said panel having a first surface and a second surface, said panel having a longitudinal bend thereon, said longitudinal bend being centrally positioned to define a first half forming an angle with a second half, said first surface corresponding to said first half facing said first surface corresponding to said second half;
    an adhesive layer being coupled to said panel, said adhesive layer being configured to adhesively engage the vertical support surface thereby retaining said panel on the vertical support surface, said adhesive layer being positioned on said first surface, said adhesive layer completely covering said first surface corresponding to each of said first half and said second half; and
    a plurality of bristles, each of said bristles being removably coupled to said panel wherein each of said bristles is configured to frictionally engage the pet thereby facilitating the pet to groom themselves, each of said bristles being positioned on said second surface, said bristles being spaced apart from each other and being distributed on said second surface, each of said bristles comprising:
        a base being positioned within said panel such that an outwardly facing surface of said base is aligned with said first surface,
        a stem being coupled to and extending away from said base wherein said stem is configured to penetrate fur of the pet when the pet rubs against said bristles, said stem extending outwardly from said second surface, said stem having a distal end with respect to said base, and
        a ball being coupled to said distal end wherein said ball is configured to comb the fur of the pet when the pet rubs against said bristles thereby facilitating loose fur to be retained on said bristles.

* * * * *